Aug. 19, 1958 W. C. PARKMAN 2,847,789
BAIT HOLDER FOR USE IN IMPALING BAIT ON A FISHHOOK
Filed April 17, 1957
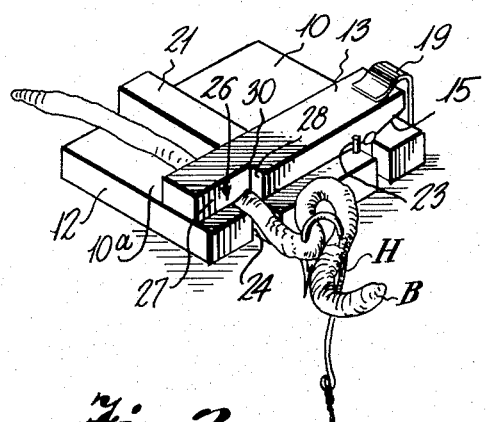
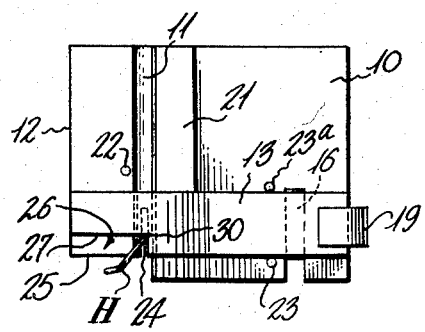
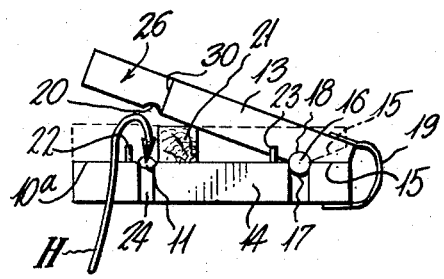
INVENTOR
William C. Parkman
BY Mason, Fenwick & Lawrence
ATTORNEYS

United States Patent Office 2,847,789
Patented Aug. 19, 1958

2,847,789

BAIT HOLDER FOR USE IN IMPALING BAIT ON A FISHHOOK

William Carmichael Parkman, Lakeland, Fla.

Application April 17, 1957, Serial No. 653,369

6 Claims. (Cl. 43—1)

This invention relates to fishing gear, and more particularly to an implement for use in holding bait while it is being attached to a fishhook.

In attaching bait of a slimy or slippery nature on a fishhook the barb of which is passed transversely through the bait, it is difficult to hold the bait steady so that the hook may be passed through the transverse center line of the bait. Usually the hook is to one side or the other of the transverse center line and has only a small hold on the bait, and where the tissue is very tender as for instance in the case of bloodworms, the hook will tear out, the friction of the water through which it is drawn being adequate to dislodge the bait.

The present invention provides a safe means of attaching bait such as that described above. Since a fisherman realizes that it is important to attach his bait by piercing it along the transverse centerline so that it will have adequate hold to prevent tearing out, he will hold the bait between his fingers and attempt to pierce it with the hook as accurately as possible. Since the bait is of a slippery nature the point of the hook sometimes pierces or snags the fisherman's finger. This is more likely to occur where the bait is looped on the hook by piercing it several times, looping it around the hook after each piercing. In the case of bloodworms, the live wriggling bait is very difficult to hold in a steady manner required for accurate piercing, the blood from previous piercings often obscuring the view.

Consequently, it is an object of the present invention to provide a device by which bait may be held and accurately pierced along its transverse centerline.

It is a further object of the present invention to provide a device whereby a plurality of transverse piercings of the bait may be made and the bait may be looped around the hook after each piercing.

Other objects of the invention will become apparent from the following description of one preferred embodiment used for describing the invention when read in conjunction with the accompanying drawings wherein.

Figure 1 is a perspective view of the bait holding and piercing guide of the present invention;

Figure 2 is a plan view of the said device showing the position in which the fishhook is held for impaling a bloodworm thereon; and Figure 3 is a side elevation viewed from the bait impaling side of the said device.

The present invention will be described with respect to a preferred embodiment thereof which may be used for attaching a blood worm on a fishhook, the bloodworm being pierced transversely at spaced points along its length to impale it on the fishhook, and the sections intermediate the piercings being wrapped around the hook.

Adverting now to the drawings, there is shown in the figures a baitholder or clamp for holding a bloodworm while it is impaled on a fishhook. The baitholder is held in one hand by the user, and the fishhook in the other hand.

A platform or block 10 of wood, plastic, metal or other suitable material provides a base for the clamp, having a slab 10a at one end. A groove 11 to receive a bloodworm B is provided which extends transversely across the top of the block 10, as shown in Figures 2 and 3 near one edge 12 of the block 10, for receiving a bloodworm. As shown in the figures, a pivotable clamping bar 13 is mounted on the block 10 normal to the groove 11 and adjacent a side edge 14 of the block 10. The clamping bar 13 has a beveled surface 15 at one end. A roller 16 provides a bearing on which the clamping bar 13 may be rocked to and from a clamping position. A groove 17 in the upper face of the block 10 and a groove 18 in the underside of the clamping bar 13 receive the roller 16 between them, each groove having a depth equal to one-half the diameter of the roller 16, thereby forming a hinge for the clamping bar 13. The beveled surface 15 extends from the groove 18 to the end of the clamping bar 13, as shown in Figure 3. When the clamping bar 13 is rocked in a direction to bring the beveled surface 15 in contact with the block 10 the clamp is open to receive the bloodworm B, and when the clamping bar 13 is rocked away from the beveled surface 15 it will clamp the bloodworm B, as shown in Figure 1. A U-shaped spring clip 19 resiliently urges the clamping bar 13 to open position, as shown in Figure 3, and holds the bar on the roller or bearing pin 16. A groove 20 of the approximate diameter of a bloodworm is formed in the bait-clamping end of the clamping bar 13 to cooperate with the groove 11 in the block 10. The grooves 11 and 20 are sized so that when a bloodworm is laid in the groove 11 and the clamping bar 13 is held down against the block 10, the bloodworm will be somewhat compressed and held in the aperture defined by the grooves 11 and 20, to provide adequate friction between the bloodworm and the walls of the grooves to hold the bloodworm while it is being impaled on the fishhook H. A guard or fence 21 is fixed to the block 10 along the side of the groove 11 to facilitate positioning the live bloodworm in the groove 11 prior to clamping it. A pin 22 on the opposite side of the groove 11 near the clamping bar insures positioning the bloodworm accurately beneath the clamping bar 13. Dowel pins 23 and 23a are for accurately guiding the clamping bar 13 in its flights between open and clamping positions.

The groove 11 terminates under the clamping bar 13, approximately midway the width of the bar, as shown in Figure 2, in a slot 24 so that the pointed barb of the fishhook H may be passed completely through the bloodworm. The clamping bar 13 is positioned on the block 10 inwardly of the edge 14 and a notch 25 is formed in the slab portion 10a approximately equal to the spacing of the bar 13 from the edge 14, making an offset in the edge 14 at the slot 24. The clamping bar 13 is likewise formed with a notch 26 by making cuts 27 and 28 at right angles, the cuts intersecting at a point which lies at the transverse center of the groove 20 and the slot 24 when the clamping bar 13 is in clamping position. The perpendicular intersection of the cuts 27 and 28 forms a guide 30 for guiding the barb of the fishhook into the bloodworm.

Most fishhooks are formed with reverse offsets, one offset being made in the shank portion and another offset in the opposite direction at the U portion of the hook. The notch 25 is provided for accommodating the offset in the shank of the fishhook H and the notch 26 is provided for accommodating the U-portion of the fishhook as the shank of the hook is turned outward during the impaling operation, and permits the barb to be kept in the plane of the slot.

Thus, the bloodworm B is placed in the groove 11 of the slab portion 10a by pushing the bloodworm against the fence 21 and lifting it over the pin 22 so that it lies in the groove 11, the clamping bar 13 is pinched downwardly and held in clamping position by two fingers of one hand. The barb of the fishhook H is placed in the guide 30 with the other hand, the fishhook H being held at an angle of about 45° to the walls of the slot 25. The fishhook H is then moved downwardly until the bend in the hook portion of the fishhook H rests on the bloodworm B. Further downward vertical movement could not be continued without tearing the bloodworm and the rear point of the fishhook barb may not have completely passed through the bloodworm. The shank of the fishhook H may then be revolved away from the slab portion 10a, at the same time keeping the barb in the plane of the slot 24 as the fishhook is moved outwardly from the slab portion 10a. The U-portion of the fishhook moves into the notch 26 to permit this movement. The movement is continued until the rear point of the barb has passed completely through the bloodworm, securely impaling the latter on the hook. The pressure on the clamping bar may then be released without allowing it to be raised enough for the worm to wriggle over the pin 22 and out of the groove 11. Then the bloodworm may be pulled outward from the slab portion 10a, at the same time revolving the fishhook to loop the bloodworm around the shank of the fishhook. The bloodworm is then clamped again and the operation of piercing it is repeated. The piercing and looping are continued as many times as required to completely impale the bloodworm on the fishhook. As each piercing is made through the transverse centerline of the bloodworm, the latter will not be disengaged from the hook when it is pulled through the water; and, since the fingers of the user are at all times remote from the point of piercing the bloodworm, there is no danger of inadvertent injury to the user in baiting a hook with a live wriggling bloodworm.

While there has been disclosed in the foregoing description a practical embodiment of a bait holder for use in impaling bait on a fishhook in accordance with the present invention, it will be understood by those skilled in the art that variations in the implementation of the concept are within the purview and scope of the invention.

What is claimed is:

1. A bait holder for use in impaling bait on a fishhook comprising a platform having a bait receiving groove thereacross for positioning the bait, a swingable clamping bar having one end pivotally mounted normal to said bait receiving groove and having its free end swingable to and from clamping relation with said bait when positioned in said bait receiving groove for holding the bait, and a guide means in said clamping bar intersecting said bait when said clamping portion is in clamping relation with the bait for guiding the point of said fishhook through the transverse centerline of the bait during impalement on the fishhook.

2. A bait holder for use in impaling bait on a fishhook comprising, a platform having a groove extending across said platform, a clamping bar pivotally mounted at one end of said platform having its free end positioned to transversely overlie said groove in said platform and having a matching groove in the under side of said free end of said clamping bar, said clamping bar having a notch positioned so that the line of juncture of adjacent sides of said notch intersects the groove in said platform when said clamping bar is in clamping relation with said platform to form a guide for said fishhook, whereby said fishhook may be guided through the transverse centerline of the bait by movement of the hook along said line of juncture of adjacent sides of the notch.

3. A bait holder for use in impaling bait on a fishhook, as claimed in claim 2, wherein a fence is positioned adjacent a portion of said groove extending across said platform.

4. A bait holder for use in impaling bait on a fishhook comprising, a platform having a groove extending transversely of said platform and terminating in a slot at one side of said platform, a clamping bar pivotally mounted on said platform having its free end portion superposed upon at least a portion of said slot and having a groove in the under side of said free end of said clamping bar in alignment with said groove and slot in said platform, said clamping bar having a notch positioned so that the line of juncture of adjacent sides of said notch intersects said slot in said platform to form a guide for the fishhook, for guiding the fishhook through the transverse centerline of the bait by movement of the hook along said line of juncture of adjacent sides of the notch, and means for resiliently biasing said clamping bar away from its superposed position.

5. A bait holder for use in impaling bait on a fishhook comprising, a platform having a groove extending transversely of said platform and terminating in a slot at one side of said platform, a clamping bar pivotally mounted on said platform having its free end portion superposed upon at least a portion of said slot, said clamping bar being set back from the edge of the side of said platform, said platform having a notch extending from said slot in the direction of the free end of said clamping bar, said clamping bar having a groove in the under side of its free end in alignment with said groove and slot in said platform, said clamping bar having a notch positioned so that the line of juncture of adjacent sides of said notch intersects said slot in said platform to form a guide for the fishhook, for guiding the fishhook through the transverse centerline of the bait by movement of the hook along said line of juncture of adjacent sides of the notch, and means for resiliently biasing said clamping bar away from its superposed position.

6. A bait holder for use in impaling bait on a fishhook comprising a platform having a bait receiving groove extending thereacross for positioning the bait, a clamping bar mounted on said platform for movement to and from a position in aligned overlying clamping relation with at least a portion of the bait in said bait receiving groove and a fishhook barb guide means operatively coupled with said clamping bar and said platform adapted to guide the point of said fishhook through the transverse centerline of said bait when clamped in said bait receiving groove.

References Cited in the file of this patent

UNITED STATES PATENTS

| | | |
|---|---|---|
| D. 168,600 | Seeber | Jan. 6, 1953 |
| 2,567,623 | Thompson | Sept. 11, 1951 |